3,110,559
PREPARATION OF SODIUM TRIPOLYPHOSPHATE
Bernard Bigot, Grand-Quevilly, France, assignor to Compagnie de Saint-Gobain, Paris, France
No Drawing. Filed Dec. 2, 1958, Ser. No. 777,594
Claims priority, application France Dec. 3, 1957
3 Claims. (Cl. 23—107)

This invention relates to the preparation of sodium tripolyphosphate, and is particularly concerned with the preparation of a product which is substantially in form II.

Industrially, the tripolyphosphate of sodium is prepared by calcining an intimate mixture of mono- and di-sodium orthophosphates between 280° and 420° C. The intimate mixture is obtained by mixing crystallized salts, or by rapid evaporation of the concentrated aqueous solution of the orthophosphates. The evaporation may be carried out by different means, the two processes most generally used industrially being drying to plate formation in rotary drums heated by steam, and atomization with mechanical or static pulverization. The standard commercial mixtures and solutions of mono-and di-orthophosphates may be used in the present invention.

The calcination of orthophosphates is carried out, according to the prior art, in various apparatuses such as rotary tubes and vertical, plate-type calciners, but when one wishes to obtain a finished product having the lowest possible percentage of that type of tripolyphosphate called form I, the process is very difficult. Form I dissolves in water with more difficulty and more slowly than form II, so that a product containing substantial quantities of form I is inconvenient for the user. The content of sodium tripolyphosphate in form I can be determined in industrial practice by calorimetric tests which measure the rise in temperature caused by the hydration of the tripolyphosphate under precise operating conditions (J. D. McGilvery, A.S.T.M. Bulletin, July 1953, 45). The rise in temperature is the greater as the content of form I is more substantial. In practice, this rise in temperature, called by technical people the "Temperature Rise Test," or T.R.T., is about 6° C. for pure form II tripolyphosphate. This is expressed as T.R.T.=6. The products satisfactory to the trade ought not to contain more than 4% of form I, and may desirably contain none. The T.R.T. for tripolyphosphate ontaining 0–4% of form I is between about 6 and about 7.

In order to prevent the formation of form I tripolyphosphate, there is a tendency to calcine the mixture of orthophosphates at relatively low temperature, but this has the objection that the transformation to tripolyphosphate is incomplete. A method of showing the degree of transformation consists in measuring the pH of a 1% aqueous solution of the product. While pure sodium tripolyphosphate will produce a pH of 9.8, experience shows that the industrial tripolyphosphates currently known, have under the same conditions pHs between about 9.2 and 9.4. These low values of pH generally show the presence in the product of sodium acid pyrophosphate, or of untransformed orthophosphates. On the other hand, in the transformation of tripolyphosphates by directly calcining mixtures of solid orthophosphates obtained by atomization, it has been demonstrated that the calcined products generally contain a substantial proportion of sodium tripolyphosphate of form I. Thus, for example, for purposes of calcination varying between ½ hour and 2½ hours at temperatures between 280° and 420° C., a mixture of orthophopshates obtained by atomization has industrially produced, for a calcination carried to 92% transformation, a product of which the T.R.T. was never less than 9, and closer to 11.

It is an object of this invention to produce, from the standard mixtures and solutions used in the art, under conditions used in the art, products which may vary from pure form II sodium tripolyphosphates to a content not exceeding about 4% of form I, and which will have a T.R.T between abut 6 and about 7 and a pH in 1% aqueous solution of at least 9.5.

In the case when the initial evaporation of the solution of orthophosphates is carried out by atomization, it is an object of the invention to procure a lowering of the T.R.T. of the final product to the vicinity of 6.

The objects of the invention are accomplished, generally speaking, by incorporating water into the product left by the evaporation of the original solution of orthophosphates before calcination. There are several methods by which the original mixtures or solutions of orthophosphates may be dried before calcination, and the product from any such drying operation will be found, after calcination, to possess the requisite low content of form I if the addition of water takes place prior to calcination. The same result is not obtained by interrupting the drying of the solutions of orthophosphates at a water content the same as that produced by adding water to the dry product.

The incorporation of the water, according to the invention, may be made by addition of hot or cold water, or by adding an aqueous concentrated solution of orthophosphate, or by cooling the orthophosphate with saturated humid air, or by more than one of these methods together. One of the surprising discoveries made by the inventor and which forms a support for the invention is that the improvement in quality of the tripolyphosphate brought about by the addition of water according to the invention, cannot be obtained by conducting the evaporation of the orthophosphate solution so as to produce a product having the same water content as that resulting from the water addition made according to the invention. It is also true that this improvement in quality of the tripolyphosphate cannot be obtained by intentionally conducting the calcination of orthophosphate in a humid atmosphere. One might theorize without being bound thereby that the good results produced by the invention are due to the formation of saline hydrates which constitute centers of calcination to the form II desired.

In order to obtain satisfactory results, the incorporation of water should be so carried out that the orthophosphates are steeped in liquid water. Periods of time adequate to produce the results are indicated in the examples.

Example 1

A mixture of monosodium orthophosphate and of disodium orthophosphate in aqueous solution, containing 1 mol. of the first salt for 2 mol. of the second salt was atomized in an atomizer at 120° C. according to practices of the prior art, and emerged with a water content of 0.5% by weight. This product was blown with air at 135° C., the same air which serves for atomization being employed. The dry solid in the moving air was suddenly brought into contact with air at 20° C. which was saturated with moisture. The temperature of the product dropped to 30° C. and its final water content was about 2%. This product was calcined for 2 hours at 330° C., producing a tripolyphosphate of T.R.T.=6.5 and of which a 1% solution presented a pH of 9.7. By way of comparison, the same product, when taken directly from the atomizer and calcined under the same conditions, that is to say, about 0.5% water, presented the following characteristics:

T.R.T. _____ 11.5
pH in 1% solution _____ 9.35

Thus, the product made according to this invention had a satisfactorily low content of form I and the product made in the regular way did not.

*Example 2*

A mixture of atomized orthophosphates was recovered from the discharge point of the atomizer at 120° C. with a 0.5% water content. Water was added at 60° C. in an open mixer consisting of a stainless steel pan, 2 meters long, provided with a single bevel-type stirrer rotating at 50 turns per minute. The product obtained after mixing was formed of agglomerates containing about 21% water and its temperature was 53° C. This product was treated for 1½ hours at 350° C. and produced a tripolyphosphate having the following characteristics:

T.R.T. _____ 6–6.8
pH _____ 9.7–9.8

By way of comparison, the same product treated in the same way except for the omission of the water content, produced a tripolyphosphate having the characteristics:

T.R.T. _____ 12–13
pH _____ 9.4

The product according to this invention was superior to the other and had a satisfactory low content of form I, whereas the second product did not.

*Example 3*

A mixture of atomized orthophosphate was taken from the discharge end of an atomizer at 120° C. containing about 0.5% of water. Water was added thereto at 20° C. using the same mixture as in Example 2. The product obtained was formed of agglomerate containing an average of 9% water and its temperature was 37° C. This product was calcined for 1½ hours at 350° C., producing a tripolyphosphate having the same characteristics as in Example 2.

*Example 4*

A mixture of orthophosphate scales was produced by drying aqueous solutions of mono- and di-orthophosphates in rotary drums heated by steam. To this product, water was added in one test, and in another test, orthophosphate liquor was added. Other tests of like nature were carried out using rapid cooling. The final product was obtained at temperatures between 30° and 60° C. and had a water content between 9% and 21%. The product was calcined at temperatures between 280° and 420° C. for periods of time varying between ½ hour and 2½ hours, in each instance producing a tripolyphosphate having a T.R.T. of 6–7 and producing in a 1% aqueous solution a pH between 9.6 and 9.8. Under the same conditions, except for the addition of water, the same product, starting from the same raw materials, produced a tripolyphosphate of T.R.T. 6–7, of which a 1% solution in water was characterized by a pH not greater thtan 9.5.

The advantage of the invention is the production of superior tripolyphosphate having a content of less than 4% of form I, as indicated by the tests which revealed its constitution. The product is more satisfactory to the user and to the manufacturer. A particular advantage is that products having this superior constitution and properties can be produced continuously on a commercial scale. Other advantages will be apparent to persons skilled in the art.

As many apparently widely different embodiments of the present invention may be made without departing from the spirit and scope thereof, it is to be understood that the invention is not limited to the specific embodiments.

What is claimed is:

1. A method of making sodium tripolyphosphate of at least 96% form II which comprises atomizing and flash drying a solution of mono- and di-sodium orthophosphate at a temperature of about 120° C. and thereby reducing the water content of the product to about 0.5% by weight, heating the material by air to about 135° C., suffusing it suddenly with cold humid air at about 20° C. until its temperature is about 30° C. and its water content about 2%, calcining it for about 2 hours at about 330° C., cooling the product, and recovering the tripolyphosphate.

2. A method of making sodium tripolyphosphate of at least 96% form II which comprises atomizing and flash drying a solution of mono- and di-sodium orthophosphate at a temperature below that required for calcination, mixing the dried product with hot dry air below 200° C. and mingling the air containing the dry phosphate with cold humid air until the phosphate contains about 2 to 21% water, calcining and cooling the product, and recovering the tripolyphosphate.

3. A method of making sodium tripolyphosphate of at least 96% form II which comprises atomizing and flash drying a solution of mono- and di-sodium orthophosphate at a temperature below that required for calcination, moistening the product below calcination temperature until its water content is between about 2 and 21% water, calcining and cooling the product, and recovering the tripolyphosphate.

References Cited in the file of this patent

UNITED STATES PATENTS

| | | |
|---|---|---|
| 2,419,148 | King | Apr. 15, 1947 |
| 2,745,717 | Edwards | May 15, 1956 |
| 2,776,187 | Pfrengle | Jan. 1, 1957 |
| 2,898,189 | Rodis et al. | Aug. 4, 1959 |
| 2,920,939 | Edwards | Jan. 12, 1960 |
| 2,977,317 | Rodis et al. | Mar. 28, 1961 |

OTHER REFERENCES

Phosphorus and Its Compounds, Van Wazer, vol. 1, Chemistry, Interscience Publishers, Inc., New York, 1958, pages 642–648.